United States Patent [19]

Döfnäs et al.

[11] Patent Number: 5,701,241
[45] Date of Patent: Dec. 23, 1997

[54] RECOVERY OF TRANSMITTED POWER IN AN INSTALLATION FOR TRANSMISSION OF HIGH-VOLTAGE DIRECT CURRENT

[75] Inventors: Lars Döfnäs; Mats Hyttinen, both of Ludvika, Sweden

[73] Assignee: Asea Brown Boveri AB, Västerås, Sweden

[21] Appl. No.: 722,228

[22] PCT Filed: May 9, 1995

[86] PCT No.: PCT/SE95/00509

§ 371 Date: Oct. 9, 1996

§ 102(e) Date: Oct. 9, 1996

[87] PCT Pub. No.: WO95/31847

PCT Pub. Date: Nov. 23, 1995

[30] Foreign Application Priority Data

May 18, 1994 [SE] Sweden ................... 9401703

[51] Int. Cl.$^6$ ........................................ H02J 3/36
[52] U.S. Cl. ........................................ 363/35; 363/51
[58] Field of Search .................... 363/34, 35, 37, 363/49, 51, 84, 85, 87, 95, 96

[56] References Cited

U.S. PATENT DOCUMENTS

| | | | |
|---|---|---|---|
| 3,992,659 | 11/1976 | Ekstrom | 363/51 |
| 4,639,848 | 1/1987 | Sakai | 363/51 |
| 4,641,042 | 2/1987 | Miyazawa | 363/34 |
| 4,727,467 | 2/1988 | Bendl et al. | 363/35 |
| 4,739,464 | 4/1988 | Nishihiro et al. | 363/37 |

OTHER PUBLICATIONS

Kimbark, Direct Current Transmission, vol. I, 1971, Wiley–Interscience, New York, Clearing Line Faults and Reenergizing the Line, Chapter 7–6, pp. 272, 279.

*Primary Examiner*—Jeffrey L. Sterrett
*Attorney, Agent, or Firm*—Pollock, Vande Sande & Priddy

[57] ABSTRACT

An installation for transmission of high-voltage direct current comprises a converter (SR1) which is controlled by a control unit (CU1). The control unit comprises a quotient-forming member, which forms a current order (IO) for the current (Id) in the dc connection of the installation in dependence on the quotient between a power order (PO) and a calculating value (UDF) of the direct voltage (Ud) at the converter, and a low-pass filter with a bandwidth (1/T1, 1/T2) capable of being controlled, which forms the calculating value as a filtered measured value (UD) of the direct voltage. The control unit comprises a signal-forming member which forms a state signal (FC), indicating that a short-circuit fault has occurred. The state signal influences the bandwidth of the low-pass filter such that the bandwidth is temporarily changed from a smaller value (1/T1) to a larger value (1/T2).

16 Claims, 3 Drawing Sheets

RECOVERY OF TRANSMITTED POWER IN AN INSTALLATION FOR TRANSMISSION OF HIGH-VOLTAGE DIRECT CURRENT

TECHNICAL FIELD

The present invention relates to a method for recovery of transmitted power in an installation for transmission of high-voltage direct current after a transient short circuit-type fault on the dc connection of the installation or in ac networks connected to the installation, and to a device for carrying out the method.

The device comprises a signal-forming member for forming a state signal, indicating that a short circuit-type fault has occurred.

BACKGROUND OF THE INVENTION

An installation for transmission of high-voltage current between two ac networks usually comprises two converters, each one on its ac side being connected to a respective one of the ac networks, as well as a dc connection which connects the direct-current terminals of one of the converters to the corresponding direct-voltage terminals on the other converter. The dc connection may be in the form of an overhead line and/or a cable and may also, in part, consist of ground or water instead of a metallic conductor. In certain cases, the converters are erected in the immediate vicinity of each other, so-called back-to-back erection, in which case the dc connection may consist of short busbars. During normal operation, one of the converters, hereinafter referred to as the rectifier, operates in rectifier operation, and the other converter, hereinafter referred to as the inverter, operates in inverter operation. The inverter is usually controlled to a maximum direct voltage suitable for the operating conditions of the installation, whereas the rectifier is then controlled in such a way that the direct current and hence the transmitted active power remain at a desired value. For this purpose, a current regulator is activated in the control system of the rectifier, which current regulator, in dependence on a comparison between a current order and a measured value of the actual direct current, controls the voltage of the rectifier such that the difference between ordered and actual current approaches zero. The current order is generated in a calculating member as the quotient between a power order supplied to this member and a measured value of the direct voltage at the rectifier. The measured direct voltage contains a certain measure of harmonics and also other noise and therefore it is filtered in a filter of low-pass character before its value is supplied to the above-mentioned calculating member. For a first-order filter with a transfer function corresponding to a single time constant, the time constant may typically be of the order of magnitude of one second.

Both the ac networks and the dc connection are subjected to short circuit-type faults or to single- or multi-phase ground faults. These faults lead to the voltage of the installation breaking down or at least significantly dropping, whereby the dc voltage of the converters is reduced to a voltage which essentially is zero. This also results in a reduction of the transmitted power to essentially zero. The above-mentioned faults are often of a rapidly changing nature, typically of a duration of the order of magnitude of <0.5 seconds, and it is desired and also often specifically required by the installation operator to be able to rapidly return the installation to the operating condition it had before the occurrence of the fault. It is a known problem, however, that the time it takes to recover the power in this kind of installations depends at the level of the direct current on the occurrence of the fault in such a way that lower current levels entail longer times for recovery of the power. This problem is further accentuated when the dc connection comprises long cables which possess a high capacitance.

SUMMARY OF THE INVENTION

The invention aims to provide a method of the kind described in the introductory part of the description, which permits a considerably shorter time for recovery of power in the installation, and a device for carrying out the method.

What characterizes a method and a device according to the invention will become clear from the appended claims.

Advantageous improvements of the invention will become clear from the following description and the claims.

BRIEF DESCRIPTION OF THE DRAWINGS

The invention will be explained in greater detail by description of embodiments with reference to the accompanying drawings, wherein FIG. 1 schematically shows an installation for transmission of high-voltage direct current.

DESCRIPTION OF THE PREFERRED EMBODIMENTS

The following description relates to the method as well as the device. Further, it is assumed, to simplify the presentation, that powers, voltages and currents, as well as their measured values and signals corresponding to these measured values, are expressed, in a known manner, in per unit.

Figure 1:
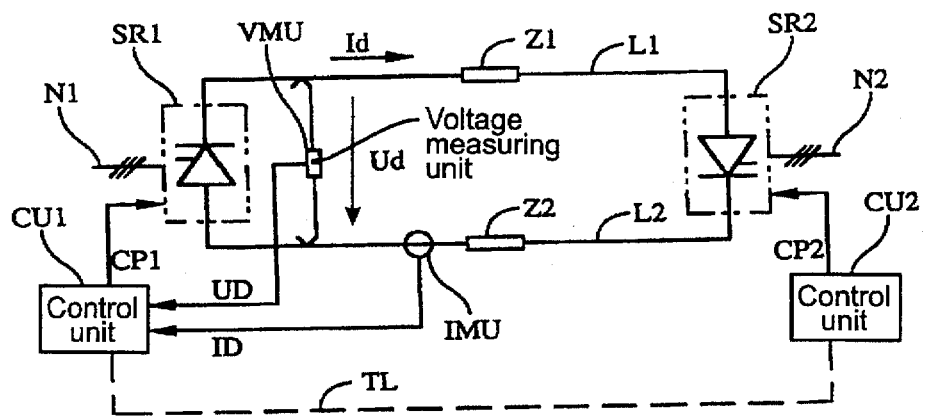

FIG. 1 shows an installation for transmission of high-voltage direct current comprising a converter SR1, connected on the ac side to a three-phase ac network N1 (only roughly indicated), a converter SR2, connected on the ac side to a three-phase ac network N2 (only roughly indicated), and a dc connection L1, L2. The dc connection connects the direct-voltage terminals of the converter SR1 to the corresponding direct-voltage terminals on the converter SR2. The impedances of the dc connection are marked by Z1, Z2, respectively, and comprise capacitances (not shown in the figure) between the conductors L1, L2 and/or between the conductors L1, L2 and ground. For the description of the embodiment it is assumed that the converter SR1 is a rectifier and is thus controlled in order to attain the desired transmitted active power for the installation, whereas the converter SR2 is an inverter. However, both converters are adapted in a known manner to operate both as rectifiers and as inverters. Each converter is equipped with a control unit CU1, CU2, respectively, which generate control pulses CP1, CP2, respectively, for the valves of the converters. These are connected to each other in a known manner via a telecommunication link TL for two-way transmission of information about the operating parameters of the converters. At the rectifier SR1, the direct voltage Ud and the direct current Id are measured with a voltage-measuring device VMU and a current-measuring device IMU, respectively. The measuring devices form measured values UD and ID, respectively, of voltage and current, which measured values are supplied to the control unit CU1.

Figure 2:
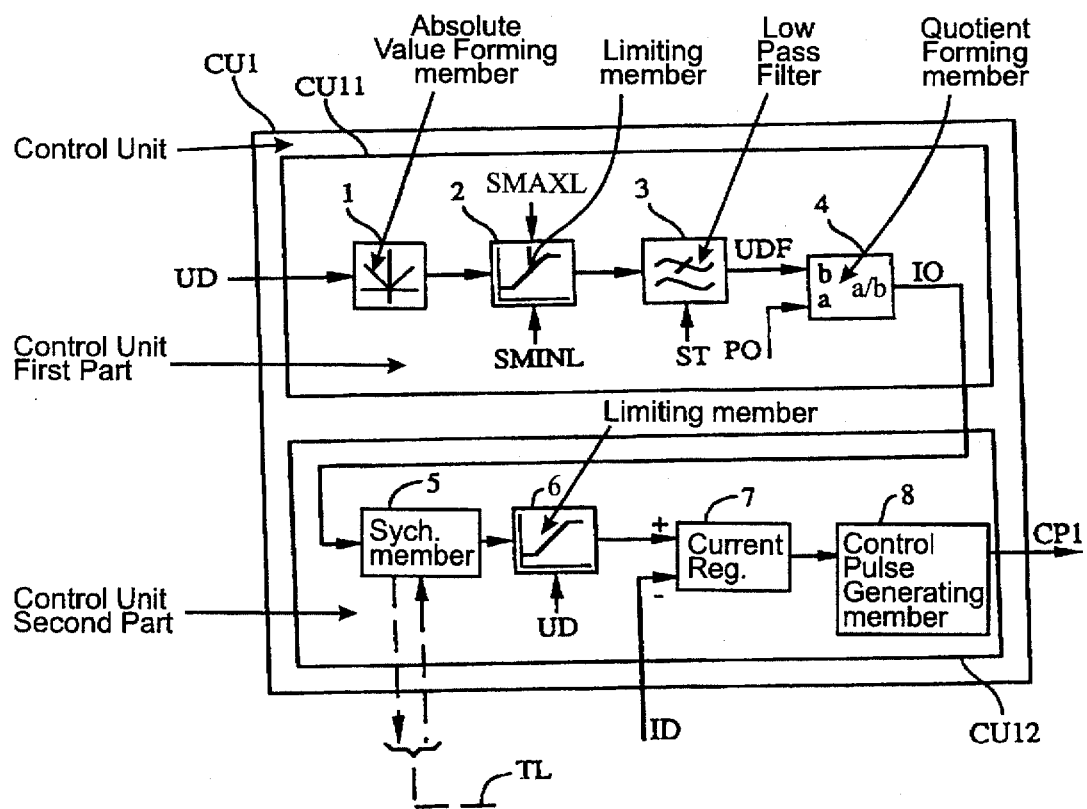
FIG. 2 shows in the form of a block diagram parts of a control system of a known embodiment for a rectifier included in an installation according to FIG. 1.

FIG. 2 shows a known manner, of those parts of the control unit CU1 which concern the control of transmitted active power and comprise a first part CU11 for forming a current order IO and a second part CU12 for forming the control pulses CP1 in dependence on the current order. The measured value UD of the voltage Ud is supplied to an absolute-value-forming member 1, which forms the absolute value of the measured value of the voltage. The absolute value is supplied to a limiting member 2, the output signal of which is proportional to the absolute value when this is above a lower limit value UDMINL and below an upper limit value UDMAXL, but which cannot be below or above these respective limit values. Both limit values may be influenced upon through signals SMAXL and SMINL, respectively, supplied to the limiting member. The output signal from the limiting member is supplied to a low-pass filter 3. A low-pass filter may generally be characterized by its bandwidth, by which is meant the maximum frequency at which its damping of an applied signal does not exceed its damping of an applied signal with the frequency zero by more than a predetermined value. The low-pass filter 3 in this embodiment is a first-order filter characterized by a time constant T and its damping amounts to 3 dB at the angular frequency $\omega=1/T$ and increases further at higher frequencies. The bandwidth of the low-pass filter is thus in this case inversely proportional to the time constant T and is characterized by the value $1/T$. The time constant T may be influenced through a signal ST which is supplied to the low-pass filter and is typically of the order of magnitude of 1 second.

The low-pass filter forms as output signal a calculating value UDF of the direct voltage Ud, which calculating value is supplied to a quotient-forming member 4. The quotient-forming member is also supplied with a power order PO for ordered transmitted active power in the installation and forms as output signal a current order IO as the quotient between the power order PO and the calculating value UDF.

The current order is supplied to a synchronization member 5, in which the current orders for the two converters are synchronized via the telecommunication link TL, and thereafter to a limiting member 6 for limiting the current order in dependence on the measured value UD of the direct voltage Ud, supplied to the limiting member mentioned. The output signal from the limiting member 6 is then supplied to a current regulator 7 as a reference value therefor. In dependence on the difference between the reference value and a measured value ID of the direct current Id, supplied to the current regulator, the current regulator generates a control signal which is supplied to a control-pulse-generating member 8, the output signal of which constitutes control pulses CP1 for the valves of the converter.

Figure 3:
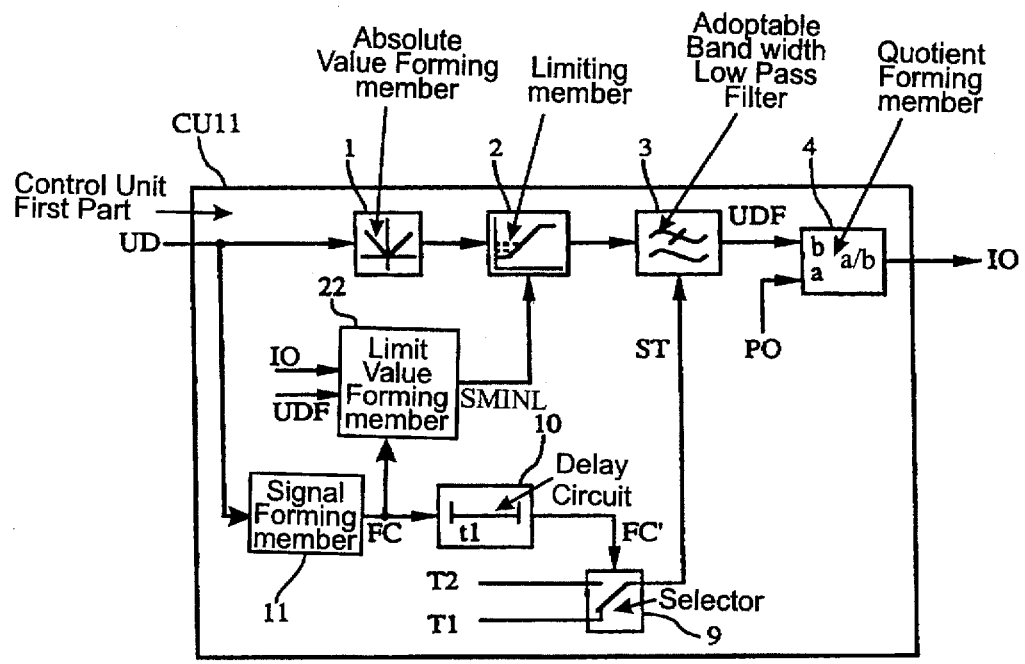
FIG. 3 shows in the form of a block diagram the formation of current orders in a control system according to FIG. 2 in one embodiment of the invention.

FIG. 3 shows an embodiment of the first part CU11 of the control unit CU1 for forming a current order IO according to the invention. The members described with reference to FIG. 2 are marked with corresponding reference numerals in FIG. 3. The embodiment of the low-pass filter 3 deviates from that shown in FIG. 2 in that its time constant T, by means of switching of a selector 9, can be caused to adopt two values T1 and T2 different from each other. The value T1 is a value chosen during normal undisturbed operation, and as mentioned above T1 is typically of the order of magnitude of 1 second. The value T2, which is chosen after the occurrence of a fault of the above-mentioned kind and for at least part of the time for recovery of the power in the installation, is typically of the order of magnitude of 0.1 second. The selector is controlled by a logic signal FC' which, when FC'="1", causes the time constant of the filter to adopt the value T2 and which, when FC'="0", causes its time constant to adopt the value T1. The signal FC' is formed in dependence on a state signal FC, generated by a signal-forming member 11. Absence of the state signal FC, that is, when its value="0", indicates that the installation is in normal undisturbed operation, and presence of the state signal FC, that is when its value="1", indicates that a fault of the above-mentioned kind has occurred. When the state signal FC changes from "0" to "1", the corresponding change of the signal FC' is delayed by a time t1 in a delay member 10. The delay t1 is typically of the order of magnitude of 0.01 second.

Figure 4A:
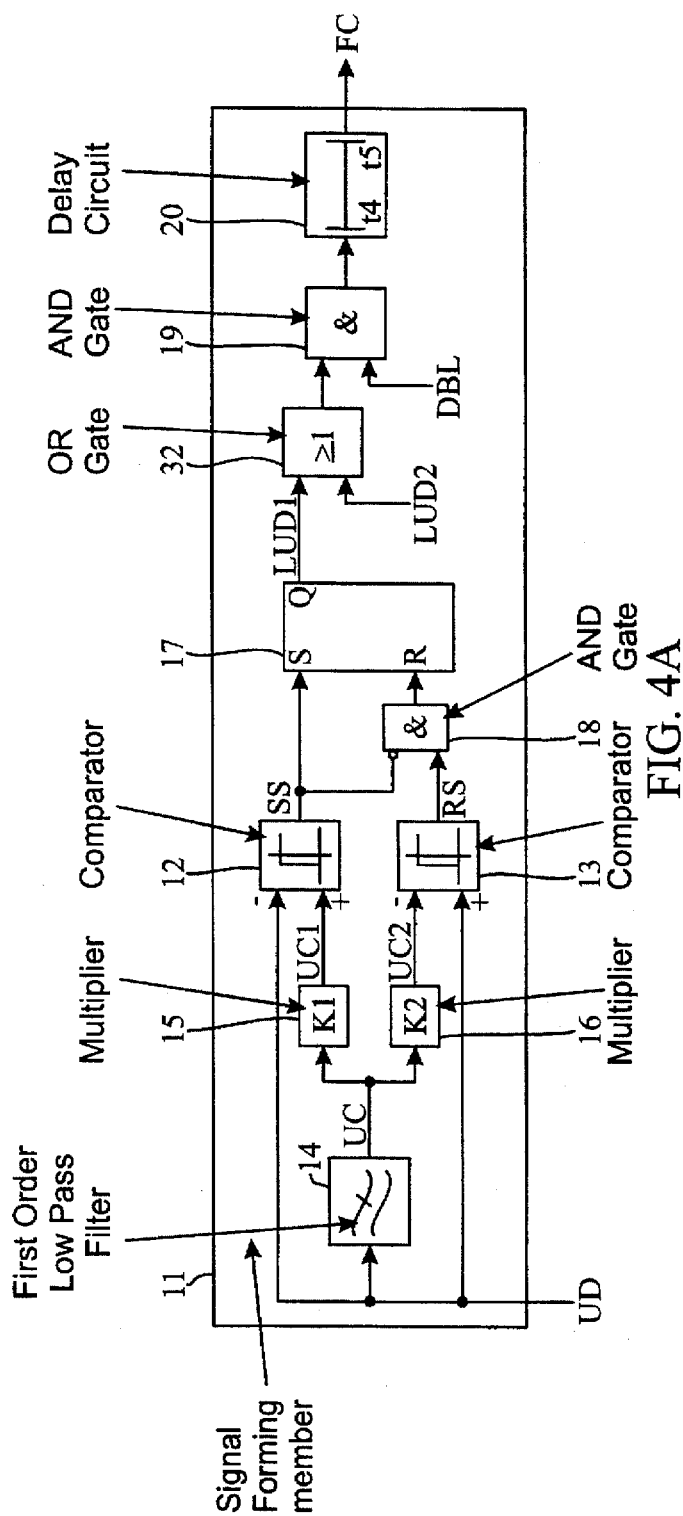
FIG. 4a shows in the form of a block diagram the formation of a state signal for indicating a fault condition in one embodiment of the invention.

FIG. 4A shows an embodiment of the signal-forming member 11 for forming the state signal FC. The measured value UD of the direct voltage Ud is supplied to a first comparator 12 and a second comparator 13 as well as to a first-order low-pass filter 14 with a time constant of the order of magnitude of 30 seconds. The output signal UC from the low-pass filter 14 is multiplied in a first multiplier 15 by a constant K1<1 to form a first comparison value UC1, which is supplied to the first comparator 12, and in a second multiplier 16 by a constant K2, where K1<K2<1, to form a second comparison value UC2, which is supplied to the second comparator 13. The first comparator 12 forms a set signal SS="1" when the instantaneous measured value UD of the direct voltage is lower than the comparison value UC1 and the second comparator forms a reset signal RS="1" when the instantaneous measured value UD of the direct voltage exceeds the comparison value UC2. It may be advantageous to design the comparators such that, as indicated in the figure, they exhibit hysteresis around the value zero of the sum of the input signals, whereby the set and reset signals, respectively, are formed when the instantaneous value of the measured value UD exceeds the comparison values by a value corresponding to half the hysteresis.

The value of the constant K1 may typically be, for example, 0.76 and the value of the constant K2 typically, for example, 0.8. The hysteresis may then typically be of the order of magnitude of 0.01.

The set signal SS is supplied to the set input S of a bistable flip-flop 17 and to an inverting input of a logic AND circuit 18, the output signal of which is supplied to the reset input R of the bistable flip-flop. During normal and undisturbed operation of the installation, the measured value UD of the direct voltage assumes a value of around 1 per unit, since the inverter normally is controlled to a maximum direct voltage suitable for the operating conditions of the installation. Under these conditions, therefore, the signal SS="0" and the signal RS="1", and therefore the signal LUD1 of the Q-output of the bistable flip-flop assumes the value "0".

When a fault of the above-mentioned kind occurs, the direct voltage is brought very rapidly, within the course of some ten or twenty msec, to zero by the control units of the converters, SS then assuming the value "1", RS assuming the value "0", and LUD1 assuming the value "1". When the voltage and its measured value, while recovering the power when returning to the normal operating condition, exceed the comparison value UC1, the signal SS returns to the value "0". The signal RS returns to the value "1" when the measured value of the voltage, while returning the installation to the normal operating condition, exceeds the comparison value UC1, the signal LUD1 thus returning to the value "0". Under the considered conditions, with transient faults which disappear within the course of typically the order of magnitude of <0.5 seconds, the voltage recovery takes place within a space of time considerably shorter than the time constant of the low-pass filter 14, and therefore the comparison values UC1 and UC2 only change to an insignificant extent during the fault and recovery period.

The signal LUD1 is supplied to a logic OR circuit 32, the output signal of which may pass through a gate circuit 19 provided that a signal DBL, indicating that the rectifier is in unblocked state, that is, that firing pulses to the controllable semiconductor elements in the converter are not blocked, is present. The output signal from the gate circuit is supplied to a delay circuit 20, which delays transitions in the input signal from "0" to "1" by a time t4 and transitions from "1" to "0" by a time t5. It is advantageous here to choose t4 of the order of magnitude 0.02 seconds and t5 of the order of magnitude 0.5 seconds. The output signal FC of the delay circuit 20 constitutes a state signal which, by assuming the value "0", indicates a normal operating condition as far as the direct voltage is concerned and, by assuming the value "1", indicates that the direct voltage is abnormally low or that the rectifier is not unblocked.

Figure 4B:
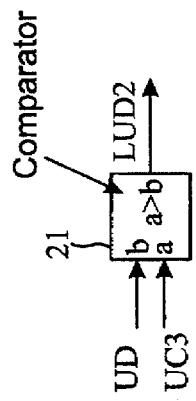
FIG. 4b shows in the form of a block diagram the formation of a state signal for indicating a fault condition in another embodiment of the invention.

FIG. 4B shows a comparator 21 which compares the measured value UD of the direct voltage with a chosen comparison value UC3 and, if UD<UC3, forms a signal LUD2. UC3 may advantageously be chosen to be of the order of magnitude of 0.73 per unit. The signal LUD2 may, for example, be supplied to a second input of the OR circuit 32 in FIG. 4A, as indicated in this figure, and thus be utilized as a safety measure when indicating a low voltage. Alternatively, only one of the signals LUD1 and LUD2 may be utilized in order to form the state signal FC in the manner shown, for example, in FIG. 4A. In this case, of course, the OR circuit 32 may be omitted.

By changing the bandwidth of the low-pass filter 3 from a smaller value to a larger value, which takes place in dependence on the signal FC', which in turn is formed in dependence on the state signal FC, the advantage is thus achieved that the calculating value UDF of the direct voltage Ud is adapted more rapidly to the instantaneous value of the direct voltage at the states which are indicated by the signal FC' having the value "1" In this way, when calculating the current order, a faster adaptation to the actual operating parameters of the installation is achieved than if, because of a smaller bandwidth in the low-pass filter, a calculating value UDF with a time lag in relation to the instantaneous direct voltage would be used for calculating the current order.

Thus, after the occurrence of the fault and during recovery of the power, the calculating value UDF will first drop by the time constant T2, instead of by the time constant T1, towards a lower limit value UDMINL, limited by the lower limit value set in the limiting member 2, and then, still by the time constant T2, follow the recovery of the voltage to the value it had before the occurrence of the fault. When the signal LUD1 and/or the signal LUD2 again assume the value "0", the signal FC assumes the value "0", causing the selector 9 to change its position such that the low-pass filter 3 will again be characterized by the time constant T1. The return of the signal FC to the value "1" is thus delayed relative to the return of the signal LUD1 and/or the signal LUD2 by the time t5 in the delay member 20, which is chosen such that it is ensured that the calculating value UDF has had time to substantially assume the measured value UD.

The faster adaptation of the filtered calculating value UDF to the instantaneous value of the direct voltage means that the current order during the course of events in question will assume a larger value than that it would have assumed during the corresponding period if the time constant of the low-pass filter 3 had remained at its higher value.

In an advantageous embodiment of the invention, the maximum value of the current order is adapted by making the lower limit value UDMINL in the limiting member 2, on the occurrence of the fault and during the recovery period, dependent on the actual value of the actual current order on the occurrence of the fault.

Figure 5:
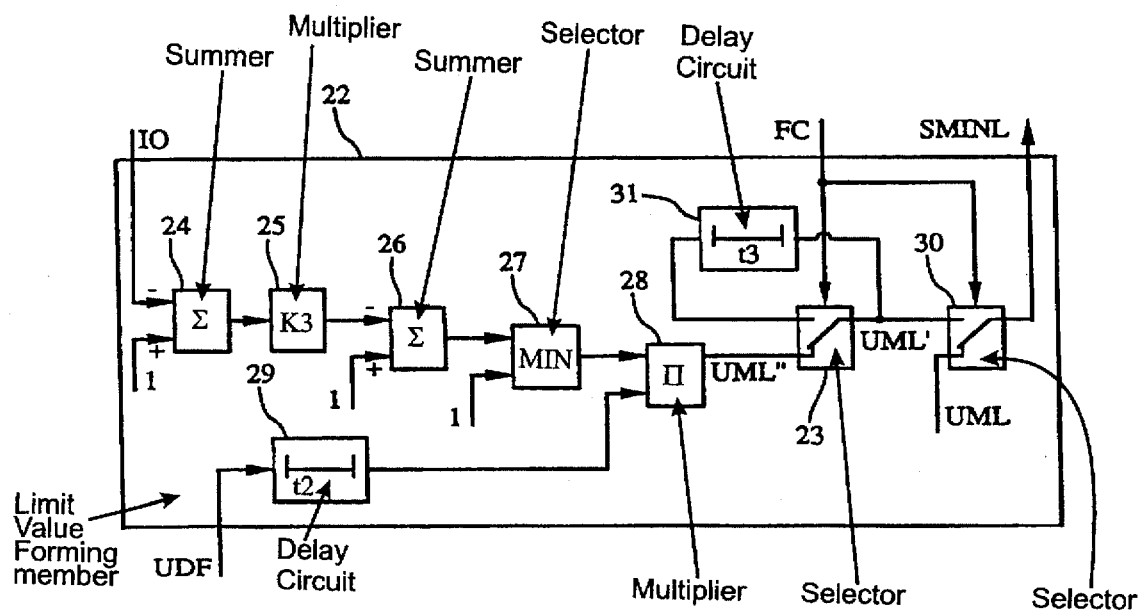
FIG. 5 shows in the form of a block diagram an embodiment for the formation of a lower limit value for the value of the direct voltage when forming current orders according to FIG. 3.

FIG. 5 shows an embodiment of a limit value-forming member 22 for achieving the above-mentioned dependence. By means of a selector 23, controlled by the state signal FC, the signal SMINL may be caused to assume a predetermined value UML when the state signal FC assumes the value "0" and a value UML', calculated in dependence on the actual current order IO and the actual calculating value UDF, when the signal FC assumes the value "1". In a summator 24 the difference between 1 per unit and the current order IO is formed, and this difference is supplied to a summator 26 after multiplication by a chosen constant K3 in a multiplier 25. A selector 27 forms as output signal the smaller of the value 1 per unit and the output signal from the summator 26. The output signal of the selector 27 is supplied to a multiplier 28 for multiplication by the calculating value UDF, delayed by a time t2 in a delay circuit 29. The time t2, which is of the order of magnitude of 15 ms, is so chosen that the calculating value UDF, at least for the first part of the recovery period, practically maintains the value it had before the occurrence of the fault. The output signal UML" from the multiplier 28 is supplied to a selector 30 controlled by the state signal FC such that, when FC="0", the signal UML', which is supplied to the selector 30, is equal to the signal UML". When the state signal FC assumes the value "1", the signal SMINL assumes the value UML'=UML". At the same time, through the switchover of the selector 30, a holding circuit is formed, comprising a delay circuit 31 such that the signal UML' maintains the value UML" it had when the state signal assumed the value "1" whereas the state signal FC remains "1". When FC again assumes the value "0", the two selectors 23 and 30 switch over, such that the lower limit value UDMINL in the limiting member 2 resumes the value UML whereas the value UML' is continuously updated in dependence on the actual current order and the actual calculating value UDF.

An arithmetical example further illustrates the function of the device. Assume that during stationary operation the power order PO=0.1 and the direct voltage Ud=1.0 and that this state has continued so long that also the calculating value UDF=1.0. This gives the current order IO=PO/UDF= 0.1. Assume further that the constant K3 is chosen to be 0.6. The input signal to the selector 27 from the summator 26 becomes [1−(1−0.1)*0.6]=0.46<1. The signal UML'=UML" therefore assumes the value 0.46*1=0.46. This value is usually higher than the value UML used during normal and stationary operation. When a fault occurs, the measured value UD will rapidly approach zero and the state signal FC will assume the value "1", whereby SMINL=UML'=0.46. At the same time, a switchover of the time constant of the low-pass filter 3 to the value T2 is made, and therefore the calculating value UDF determined by this time constant drops towards its lower limit value 0.46. Provided that the power order remains at the value PO=0.1, the current order IO, determined by the time constant T2, will increase towards a value 0.1/0.46=0.22. This entails an increase of about 120% compared with the value IO=0.1 which, determined by the time constant T1, would have remained for a considerably longer time, with the numerical examples stated above in reality during the whole recovery process. In those cases where the dc connection comprises a cable and its impedance is essentially determined by the capacitance of the cable, the doubling of the current order and hence the current, exemplified above, entails a halving of the charging time of the cable. When the calculating value UDF during the return to the preceding operating condition increases above the value 0.46, the current order will decrease towards the earlier value 0.1.

In the event that the fault had occurred at a power order of, for example, PO=0.3, the input signal to the selector 27 from the summator 26, and hence the signal UML', would have assumed the value [1−(1−0.3)*0.6]=0.58 and during a fault condition the current order would have increased towards a value IO=0.3/0.58=0.51, an increase by about 70% compared with the value IO=0.3.

At higher power orders before the occurrence of the fault, the voltage-dependent current limit arranged in the limiting member 6 may intervene and limit the current order during at least the beginning of the recovery time. With the invention, however, the current order may always be caused to assume a maximum value during the recovery period, taking into consideration the dimensioning of the installation in other respects.

The invention is not limited to the embodiments shown, but a plurality of modifications are feasible within the scope of the inventive concept. The low-pass filter 3 has been exemplified with a single time constant T1, T2, respectively, but, of course, within the scope of the inventive concept the corresponding advantages can also be obtained in case of low-pass filters of a higher order.

A reduction of the time constant T for the low-pass filter 3 exemplified above from the value T1 to the value T2 from 1 second to 0.1 second thus corresponds to an increase of its bandwidth by a factor 10, and in more general terms, in those cases where the low-pass filter 3 is characterized by a general transfer function with a predetermined bandwidth, an increase of this bandwidth during a fault condition and during the recovery period is within the scope of the inventive concept.

The value T1 of the time constant of the low-pass filter is typically of the order of magnitude of 1 second, but may in certain cases be as low as about 0.3 seconds. It has been found to be advantageous to select the value T2 to be about 0.05 to 0.1 seconds, which thus entails an increase of the bandwidth of the filter by at least a factor 3.

The formation of the lower limit value UDMINL of the limiting value UDF and the formation of the state signal FC may, of course, also within the scope of the inventive concept be made in other ways.

The calculating members, the filters, the comparators, etc., included in the device, may be implemented, wholly or partially, as hard-wired, analogically or digitally operating circuits, or in microprocessors programmed for the specific purpose.

We claim:

1. A device for recovery of transmitted power in an installation for transmission of high-voltage direct current after a transitory short-circuit fault on the dc connection (L1,L2) of the installation or in ac networks (N1,N2) connected to the installation, in which installation a converter (SR1) is controlled by means of a control unit (CU1), comprising a quotient-forming member, which forms a current order (IO) for the current (Id) in the dc connection in dependence on the quotient between a power order (PO) and a calculating value (UDF) of the direct voltage (Ud) at the converter, a low-pass filter which forms the calculating value as a filtered measured value (UD) of the direct voltage, said low-pass filter having a bandwidth (1/T1, 1/T2) capable of being influenced, wherein the control unit comprises a signal-forming member which forms a state signal (FC), indicating that a short-circuit fault has occurred, said state signal influencing the bandwidth of the low-pass filter such that the bandwidth is temporarily changed from a smaller value (1/T1) to a larger value (1/T2).

2. A device according to claim 1, wherein the control unit comprises a limiting value-forming member (22) to form, in dependence on the state signal, a lower limit value (UDMINL) for the calculating value (UDF) as a value (UML') formed in dependence on the current order.

3. A device according to claim 2, wherein the lower limit value formed by the limiting value-forming member increases with increasing current order.

4. A device according to claim 1, wherein the bandwidth is changed from the smaller value to the larger value after the formation of the state signal, and the bandwidth is changed from the larger value to the smaller value after the disappearance of the state signal.

5. A device according to claim 1, wherein the larger value of the bandwidth of the low-pass filter is at least 3 times larger than the smaller value of its bandwidth.

6. A device according to claim 1, wherein the low-pass filter is of the first order with a bandwidth characterized by a filter time constant (T1,T2), wherein the bandwidth of the low-pass filter is changed by changing the filter time constant from a larger value (T1) to a lower value (T2).

7. A device according to claim 1, wherein the signal-forming member comprises at least one comparator to compare the measured value (UD) of the direct voltage with at least one comparison value (UC3), whereby the state signal is formed after the measured value of the direct voltage has fallen below the comparison value and disappears after the measured value of the direct voltage has risen above the comparison value.

8. A device according to claim 7, wherein the signal-forming member comprises at least two comparators to compare the measured value (UD) of the direct voltage with a first comparison value (UC1) and a second comparison value (UC2), respectively, whereby the state signal is formed after the measured value of the direct voltage has fallen below the first comparison value and disappears after the measured value of the direct voltage has risen above the comparison value.

9. A method for recovery of transmitted power in an installation for transmission of high-voltage direct current after a transitory short-circuit fault on the dc connection (L1,L2) of the installation or in ac networks (N1,N2) connected to the installation, in which installation a converter (SR1) is controlled in such a way that a current order (IO) for the current (Id) in the dc connection is formed in dependence on the quotient between a power order (PO) and a calculating value (UDF) of the direct voltage (Ud) at the converter, the calculating value being formed in dependence on a measured value (UD) of the direct voltage, said measured value being filtered in a low-pass filter with a bandwidth (1/T1,1/T2) capable of being influenced, wherein a state signal (FC) is formed, indicating that a short-circuit fault has occurred, and, in dependence on said state signal, the bandwidth of the low-pass filter is temporarily changed from a smaller value (1/T1) to a larger value (1/T2).

10. A method according to claim 9, wherein the calculating value (UDF) is limited to a lower limit value (UDMINL), which in dependence on the state signal is caused to assume a value (UML') formed in dependence on the current order.

11. A method according to claim 10, wherein the lower limit value is caused to assume a value which increases with increasing current order.

12. A method according to claim 9, wherein the bandwidth is changed from the smaller value to the larger value after the formation of the state signal and the bandwidth is changed from the larger value to the smaller value after the disappearance of the state signal.

13. A method according to claim 9, wherein the larger value of the bandwidth is at least three times larger than the smaller value thereof.

14. A method according to claim 9, wherein the low-pass filter is of the first order with a bandwidth characterized by a filter time constant (T1, T2), wherein the bandwidth is changed by changing the filter time constant from a larger value (T1) to a lower value (T2).

15. A method according to claim 9, wherein the state signal is formed after the measured value of the direct voltage has fallen below a first predetermined comparison value (UC1) and disappears after the measured value of the direct voltage has risen above a second predetermined comparison value (UC2).

16. A method according to claim 15, wherein the first and second predetermined comparison values are identical.

* * * * *